US012736966B2

(12) United States Patent
Kotoku et al.

(10) Patent No.: US 12,736,966 B2
(45) Date of Patent: Sep. 15, 2026

(54) MAP DATA GENERATION DEVICE, MOVABLE APPARATUS MANAGEMENT DEVICE, STORAGE MEDIUM, MAP DATA GENERATION METHOD, AND MOVABLE APPARATUS MANAGEMENT METHOD

(71) Applicant: CANON KABUSHIKI KAISHA, Tokyo (JP)

(72) Inventors: Masashi Kotoku, Kanagawa (JP); Hideaki Ooba, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 18/490,830

(22) Filed: Oct. 20, 2023

(65) Prior Publication Data

US 2024/0160215 A1 May 16, 2024

(30) Foreign Application Priority Data

Nov. 15, 2022 (JP) ................................ 2022-182489

(51) Int. Cl.
*G05D 1/00* (2024.01)
*G06V 20/56* (2022.01)
*G06V 20/64* (2022.01)

(52) U.S. Cl.
CPC ......... *G05D 1/0274* (2013.01); *G05D 1/0212* (2013.01); *G06V 20/56* (2022.01); *G06V 20/64* (2022.01)

(58) Field of Classification Search
CPC .. G05D 1/0274; G05D 1/0212; G05D 1/2246; G05D 2109/10; G05D 1/242;
(Continued)

(56) References Cited

U.S. PATENT DOCUMENTS

2019/0122386 A1* 4/2019 Wheeler ............ G01C 21/1652
2019/0179320 A1* 6/2019 Pacala ..................... G01S 17/42
(Continued)

FOREIGN PATENT DOCUMENTS

CN 109903367 A 6/2019
EP 3563265 B1 6/2021
(Continued)

OTHER PUBLICATIONS

Extended European Search Report issued in corresponding EP Patent Application No. 23203474.4 dated Feb. 16, 2024, pp. 1-9.
(Continued)

*Primary Examiner* — Ig T An

(74) *Attorney, Agent, or Firm* — Carter, DeLuca & Farrell LLP

(57) ABSTRACT

In order to provide a map which can contribute to performance of smooth operation of a movable apparatus which autonomously moves to the movable apparatus, a map data generation device includes an operation data reception unit configured to receive operation data indicating results of a movable apparatus autonomously moving in a space and performing a predetermined operation, and a map data generation unit configured to generate map data which is used when the movable apparatus autonomously moves in the space and performs the predetermined operation on the basis of the operation data.

9 Claims, 7 Drawing Sheets

(58) Field of Classification Search
CPC ...... G05D 1/2464; G06V 20/56; G06V 20/64; G01C 21/383; G01C 21/3841; G01C 21/3885; G06F 16/29
See application file for complete search history.

(56) References Cited

U.S. PATENT DOCUMENTS

| | | | |
|---|---|---|---|
| 2019/0265703 A1* | 8/2019 | Hicok | B60W 60/00253 |
| 2021/0325898 A1 | 10/2021 | Golov | |
| 2022/0026920 A1* | 1/2022 | Ebrahimi Afrouzi | G06N 3/0495 |

FOREIGN PATENT DOCUMENTS

| | | |
|---|---|---|
| JP | 2021-077053 A | 5/2021 |
| KR | 20210106162 A | 8/2021 |

OTHER PUBLICATIONS

European Search Report issued in corresponding EP Patent Application No. 23203474.4 dated Dec. 19, 2024, pp. 1-7.

* cited by examiner

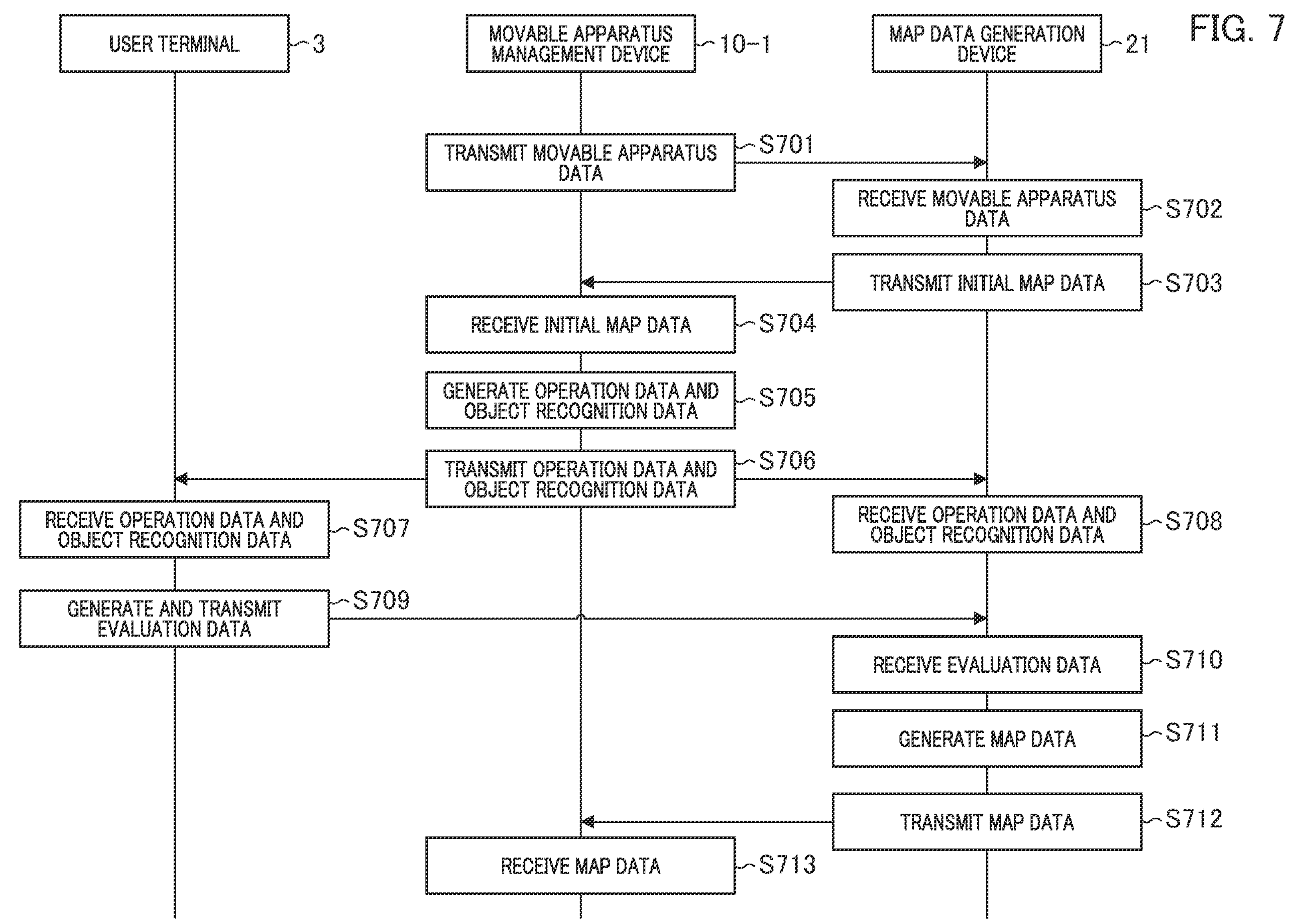
FIG. 7
USER TERMINAL
3
MOVABLE APPARATUS MANAGEMENT DEVICE
10-1
MAP DATA GENERATION DEVICE
21
TRANSMIT MOVABLE APPARATUS DATA
S701
RECEIVE MOVABLE APPARATUS DATA
S702
TRANSMIT INITIAL MAP DATA
S703
RECEIVE INITIAL MAP DATA
S704
GENERATE OPERATION DATA AND OBJECT RECOGNITION DATA
S705
TRANSMIT OPERATION DATA AND OBJECT RECOGNITION DATA
S706
RECEIVE OPERATION DATA AND OBJECT RECOGNITION DATA
S707
RECEIVE OPERATION DATA AND OBJECT RECOGNITION DATA
S708
GENERATE AND TRANSMIT EVALUATION DATA
S709
RECEIVE EVALUATION DATA
S710
GENERATE MAP DATA
S711
TRANSMIT MAP DATA
S712
RECEIVE MAP DATA
S713

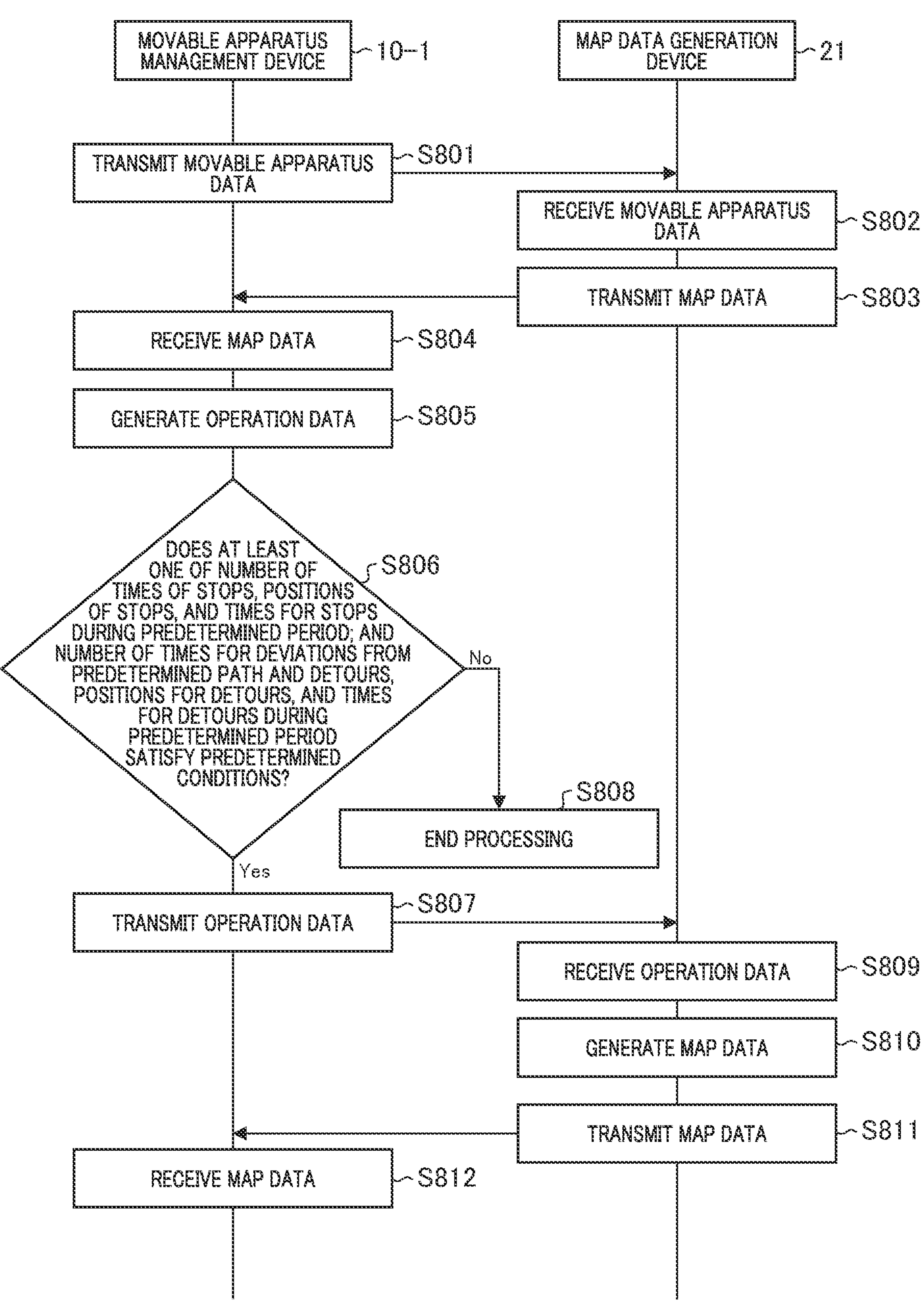
FIG. 8
MOVABLE APPARATUS MANAGEMENT DEVICE
10-1
MAP DATA GENERATION DEVICE
21
TRANSMIT MOVABLE APPARATUS DATA
S801
RECEIVE MOVABLE APPARATUS DATA
S802
TRANSMIT MAP DATA
S803
RECEIVE MAP DATA
S804
GENERATE OPERATION DATA
S805
DOES AT LEAST ONE OF NUMBER OF TIMES OF STOPS, POSITIONS OF STOPS, AND TIMES FOR STOPS DURING PREDETERMINED PERIOD; AND NUMBER OF TIMES FOR DEVIATIONS FROM PREDETERMINED PATH AND DETOURS, POSITIONS FOR DETOURS, AND TIMES FOR DETOURS DURING PREDETERMINED PERIOD SATISFY PREDETERMINED CONDITIONS?
S806
No
S808
END PROCESSING
Yes
TRANSMIT OPERATION DATA
S807
RECEIVE OPERATION DATA
S809
GENERATE MAP DATA
S810
TRANSMIT MAP DATA
S811
RECEIVE MAP DATA
S812

MAP DATA GENERATION DEVICE, MOVABLE APPARATUS MANAGEMENT DEVICE, STORAGE MEDIUM, MAP DATA GENERATION METHOD, AND MOVABLE APPARATUS MANAGEMENT METHOD

BACKGROUND OF THE INVENTION

Field of the Invention

The present invention relates to a map data generation device, a movable apparatus management device, a storage medium, a map data generation method, and a movable apparatus management method.

Description of the Related Art

Currently, autonomous mobile robots which autonomously move at various places, such as office buildings, residences, and distribution centers, and perform a predetermined operation such as work are being developed. When such movable apparatuses autonomously move in a space and perform a predetermined operation, they need a map of the space.

In addition, regarding a technology of providing such a map to movable apparatus which autonomously move, for example, Japanese Patent Laid-Open No. 2021-77053 discloses a map information providing system.

This map information providing system includes a database, an image data generation unit, and a data transmission/reception unit. The database stores three-dimensional point cloud data related to an area where an autonomous mobile device travels.

The image data generation unit generates two-dimensional planar image data by cutting out two-dimensional point cloud data of a height designated by the autonomous mobile device from the three-dimensional point cloud data read from the database. The data transmission/reception unit can transmit two-dimensional planar image data or point cloud data generated by the image data generation unit to the autonomous mobile device.

However, if specifications of a movable apparatus, features of a space in which the movable apparatus moves, features of an operation performed by the movable apparatus in the space, and the like are not sufficiently taken into consideration, the map described above may not be able to contribute to smooth operation performed by a movable apparatus which autonomously moves.

SUMMARY OF THE INVENTION

A map data generation device according to an aspect of the present invention includes at least one processor or circuit configured to function as: an operation data reception unit configured to receive operation data indicating results of a movable apparatus autonomously moving in a space and performing a predetermined operation; and a map data generation unit configured to generate map data which is used when the movable apparatus autonomously moves in the space and performs the predetermined operation on the basis of the operation data.

Further features of the present invention will become apparent from the following description of embodiments with reference to the attached drawings.

BRIEF DESCRIPTION OF THE DRAWINGS

FIG. 7 is a sequence diagram showing an example of processing performed by the map data generation system according to the embodiment.

FIG. 8 is a sequence diagram showing another example of processing performed by the map data generation system according to the embodiment.

DESCRIPTION OF THE EMBODIMENT

Embodiment

Hereinafter, with reference to the accompanying drawings, favorable modes of the present invention will be described using Embodiments. In each diagram, the same reference signs are applied to the same members or elements, and duplicate description will be omitted or simplified.

Figure 1:
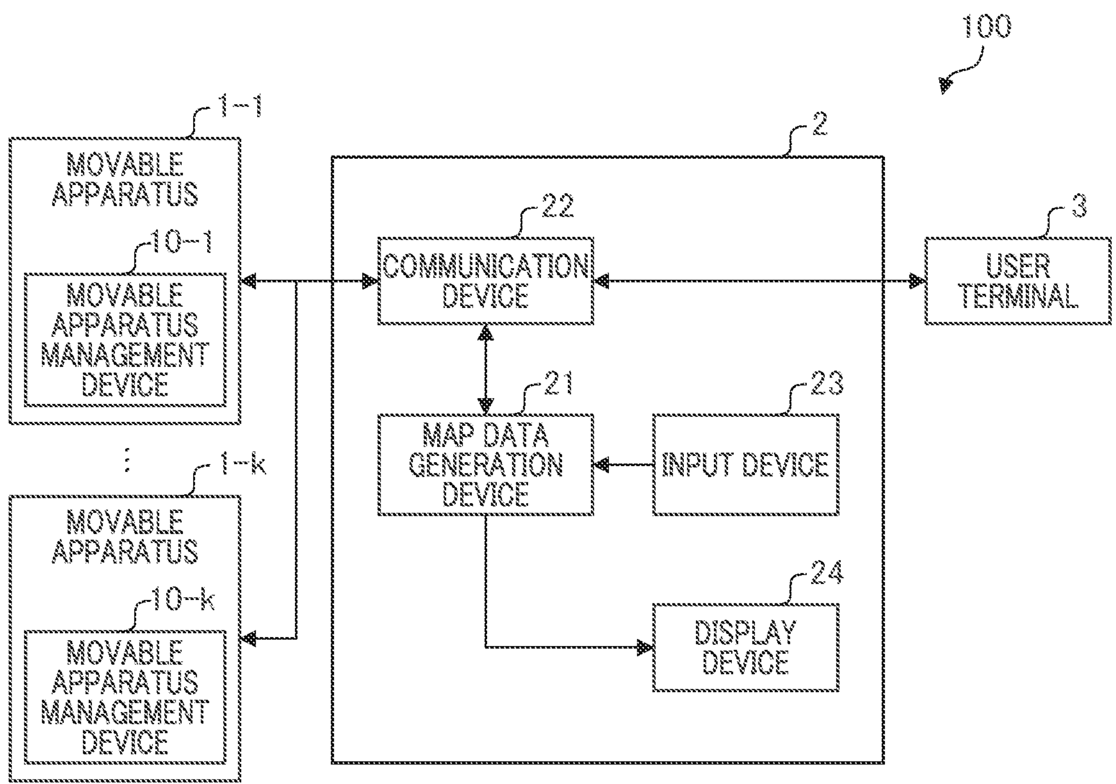
FIG. 1 is a view showing an example of a map data generation system according to an embodiment.

FIG. 1 is a view showing an example of a map data generation system according to an embodiment. As shown in FIG. 1, a map data generation system 100 includes a movable apparatus 1-1 and so on to a movable apparatus 1-*k* (k: an integer of 1 or larger), an information processing device 2, and a user terminal 3.

For example, the movable apparatus 1-1 and so on to the movable apparatus 1-*k* are autonomous mobile robots, automatic guided vehicles (AGV), or the like performing a predetermined operation such as cleaning or luggage transportation in a space inside a building such as an office building. A sensor is mounted in each of the movable apparatus 1-1 and so on to the movable apparatus 1-*k*, and they autonomously move in a space by ascertaining the space around themselves with this sensor.

For example, this sensor is a two-dimensional or three-dimensional light detection and ranging (LIDAR) or a stereo camera. A LIDAR ascertains the position, the dimensions, the shape, and the like of each of objects present in a space by measuring the distance to each point on each of the objects present in the space and generating point cloud data.

A stereo camera ascertains the position, the dimensions, the shape, and the like of each of objects present in a space by measuring the distance to each point on each of the objects present in the space on the basis of a triangulation method and generating a set of feature points.

Figure 2:
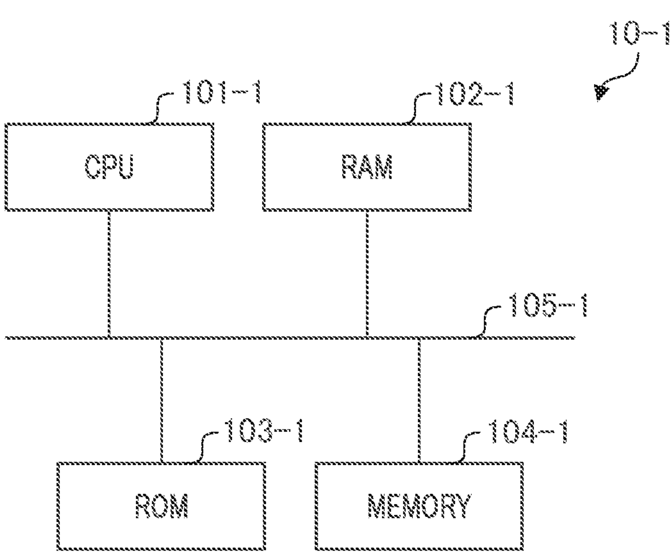
FIG. 2 is a view showing an example of a hardware constitution of a movable apparatus management device according to the embodiment.

The movable apparatus 1-1 includes a movable apparatus management device 10-1 shown in FIG. 2. Similarly, the movable apparatus 1-*k* includes a movable apparatus management device 10-*k* shown in FIG. 2. The movable apparatus management device 10-1 generates operation data indicating results obtained by causing the movable apparatus 1-1 to autonomously move in a space and perform a predetermined operation.

In addition, the movable apparatus management device 10-1 receives map data which is used when the movable apparatus 1-1 is caused to autonomously move in a space and perform a predetermined operation and is generated on the basis of the operation data. Details of the movable apparatus management device 10-1 and so on to the movable apparatus management device **10-*k*** will be described below.

The movable apparatus management device 10-1 may not be mounted in the movable apparatus 1-1. For example, the movable apparatus management device 10-1 may be mounted in an apparatus other than the movable apparatus 1-1 or may be one independent apparatus.

Similarly, the movable apparatus management device **10-*k* may not be mounted in the movable apparatus 1-*k*. For example, the movable apparatus management device 10-*k* may be mounted in an apparatus other than the movable apparatus 1-*k*** or may be one independent apparatus.

In the following description, if the movable apparatus 1-1 and so on to the movable apparatus **1-*k* are described, the movable apparatus 1-1 will be described as an example. In addition, in the following description, if the movable apparatus management device 10-1 and so on to the movable apparatus management device 10-*k* are described, the movable apparatus 1-*k*** will be described as an example.

For example, the information processing device 2 is installed in a data center. As shown in FIG. 1, the information processing device 2 includes a map data generation device 21, a communication device 22, an input device 23, and a display device 24.

The map data generation device 21 generates the map data on the basis of the operation data described above and transmits the map data to the movable apparatus 1-1 or so on to the movable apparatus **1-*k*. Details of the map data generation device 21** will be described below.

The communication device 22 realizes communication between the information processing device 2 and the movable apparatus 1-1 and so on to the movable apparatus **1-*k* or the user terminal 3. For example, the input device 23 is a mouse or a keyboard, which is used for inputting data, an instruction, or the like to the information processing device 2. For example, the display device 24 is a display, which displays information presented to a user or the like of the information processing device 2**.

For example, the user terminal 3 is a computer installed in a management base at a place different from the data center. The user terminal 3 is used for operating the information processing device 2 from the management base at a place different from the data center. The management base can be installed at an arbitrary place and may be installed at the same place as the data center, for example.

Next, a hardware constitution of the movable apparatus management device according to the embodiment will be described with reference to FIG. 2. FIG. 2 is a view showing an example of a hardware constitution of the movable apparatus management device according to the embodiment. As shown in FIG. 2, the movable apparatus management device 10-1 includes a central processing unit (CPU) 101-1, a random access memory (RAM) 102-1, a read only memory (ROM) 103-1, a memory 104-1, and a bus 105-1.

The CPU 101-1 realizes each of the functions of the movable apparatus management device 10-1 by reading and executing a program. The RAM 102-1 is a recording medium in which the program read and executed by the CPU 101-1 is temporarily developed.

The ROM 103-1 is a recording medium in which the program read and executed by the CPU 101-1 is saved. The memory 104-1 is a recording medium in which the operation data and the like are saved. The bus 105-1 connects the CPU 101-1, the RAM 102-1, the ROM 103-1, and the memory 104-1 in a form in which they can communicate with each other.

Figure 3:
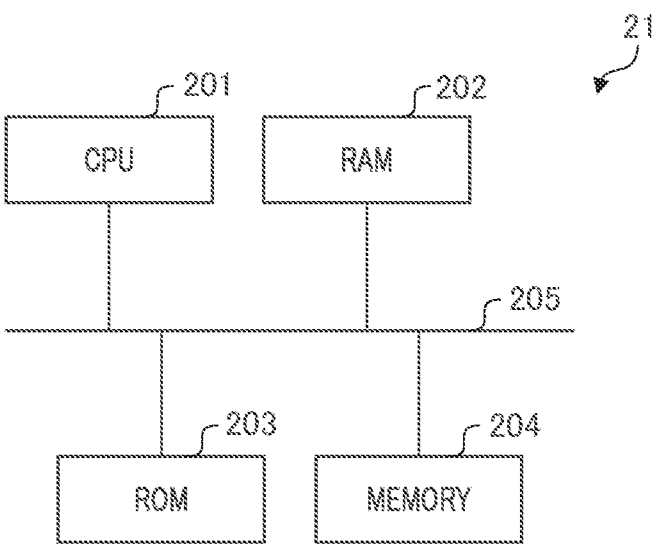
FIG. 3 is a view showing an example of a hardware constitution of a map data generation device according to the embodiment.

Next, a hardware constitution of the map data generation device 21 according to the embodiment will be described with reference to FIG. 3. FIG. 3 is a view showing an example of a hardware constitution of a map data generation device according to the embodiment. As shown in FIG. 3, the map data generation device 21 includes a CPU 201, a RAM 202, a ROM 203, a memory 204, and a bus 205.

The CPU 201 realizes each of the functions of the map data generation device 21 by reading and executing a program. The RAM 202 is a recording medium in which the program read and executed by the CPU 201 is temporarily developed.

The ROM 203 is a recording medium in which the program read and executed by the CPU 201 is saved. The memory 204 is a recording medium in which the map data and the like are saved. The bus 205 connects the CPU 201, the RAM 202, the ROM 203, and the memory 204 in a form in which they can communicate with each other.

Figure 4:
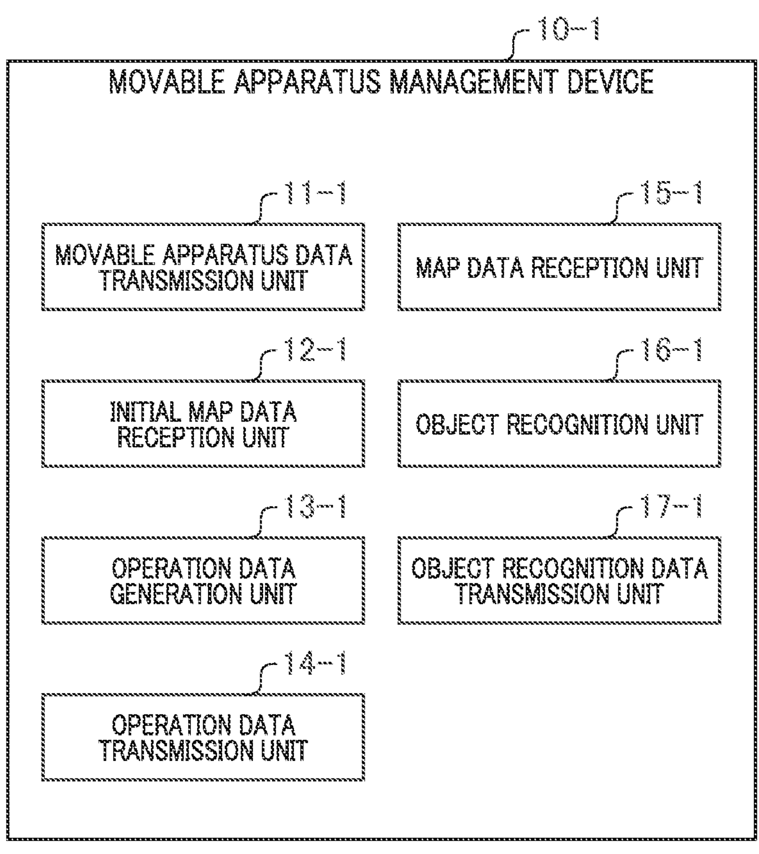
FIG. 4 is a view showing an example of a software constitution of the movable apparatus management device according to the embodiment.
Figure 5:
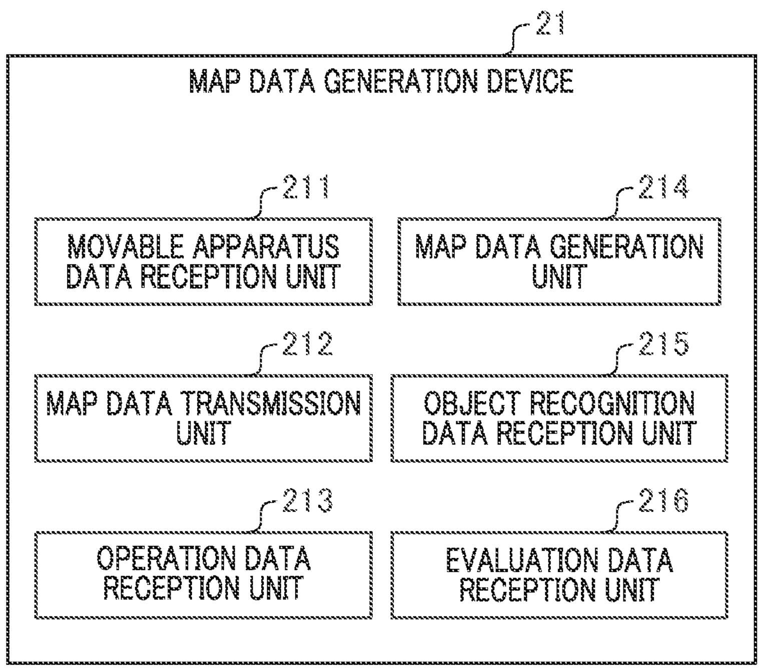
FIG. 5 is a view showing an example of a software constitution of the map data generation device according to the embodiment.

Next, a software constitution of the movable apparatus management device and a software constitution of the map data generation device according to the embodiment will be described with reference to FIGS. 4 and 5. FIG. 4 is a view showing an example of a software constitution of the movable apparatus management device according to the embodiment. FIG. 5 is a view showing an example of a software constitution of the map data generation device according to the embodiment.

As shown in FIG. 4, the movable apparatus management device 10-1 includes a movable apparatus data transmission unit 11-1, an initial map data reception unit 12-1, an operation data generation unit 13-1, an operation data transmission unit 14-1, a map data reception unit 15-1, an object recognition unit 16-1, and an object recognition data transmission unit 17-1.

As shown in FIG. 5, the map data generation device 21 includes a movable apparatus data reception unit 211, a map data transmission unit 212, an operation data reception unit 213, a map data generation unit 214, an object recognition data reception unit 215, and an evaluation data reception unit 216.

The movable apparatus data transmission unit 11-1 transmits movable apparatus data indicating information capable of identifying the movable apparatus 1-1 to the map data generation device 21. Examples of such information include at least one combination of numerals, alphabetical characters, symbols, and the like unique to the movable apparatus 1-1. The movable apparatus data reception unit 211 receives the movable apparatus data from the movable apparatus management device 10-1.

The map data transmission unit 212 transmits initial map data which is used when the movable apparatus 1-1 autonomously moves in a space to the movable apparatus management device 10-1. The initial map data is data expressing the inside of a space as point cloud data or a set of feature points and is map data determined to be used by the movable apparatus 1-1 until the movable apparatus data is received. The initial map data reception unit 12-1 receives the initial map data from the map data generation device 21.

The operation data generation unit 13-1 generates operation data indicating at least a part of results obtained by causing the movable apparatus 1-1 to autonomously move in a space and perform a predetermined operation. At this time, the movable apparatus 1-1 autonomously moves using the initial map data and performs a predetermined operation.

For example, the operation data indicates results of the movable apparatus 1-1 autonomously moving in a space in its entirety or a part of a space and performing a predetermined operation. In addition, for example, the operation data may indicate at least one of a path through which the movable apparatus 1-1 moves in a space and a region in which the movable apparatus 1-1 performs a predetermined operation in a space.

In addition, the operation data generation unit 13-1 may generate operation data indicating the number of times of stops during a predetermined period when the movable apparatus 1-1 autonomously moves in a space and performs a predetermined operation. Alternatively, the operation data generation unit 13-1 may generate operation data indicating positions of stops during a predetermined period when the movable apparatus 1-1 autonomously moves in a space and performs a predetermined operation.

Alternatively, the operation data generation unit 13-1 may generate operation data indicating times for stops during a predetermined period when the movable apparatus 1-1 autonomously moves in a space and performs a predetermined operation.

In addition, the operation data generation unit 13-1 may judge that the cause of a stop of the movable apparatus 1-1 is a person, an animal, the movable apparatus 1-2 or so on to the movable apparatus 1-*k*, or the like. Further, if it is judged that the cause of a stop of the movable apparatus 1-1 is a person, an animal, the movable apparatus 1-2 or so on to the movable apparatus 1-*k*, or the like, the operation data generation unit 13-1 may not count it as the number of times of stops during a predetermined period when the movable apparatus 1-1 autonomously moves in a space and performs a predetermined operation.

Similarly, if it is judged in this manner, the operation data generation unit 13-1 may not recognize it as the positions of stops during a predetermined period when the movable apparatus 1-1 autonomously moves in a space and performs a predetermined operation. In addition, if it is judged in this manner, the operation data generation unit 13-1 may not recognize it as the times for stops during a predetermined period when the movable apparatus 1-1 autonomously moves in a space and performs a predetermined operation.

Alternatively, the operation data generation unit 13-1 may generate operation data indicating the number of times of deviations from a predetermined path and detours during a predetermined period. Alternatively, the operation data generation unit 13-1 may generate operation data indicating positions of deviations from a predetermined path and detours during a predetermined period. Alternatively, the operation data generation unit 13-1 may generate operation data indicating times for deviations from a predetermined path and detours during a predetermined period.

In addition, the predetermined period described above may have a length shorter than a time during which a movable apparatus autonomously moves in a space and ends performance of a predetermined operation. If the predetermined period has such a length, the map data generation system 100 can immediately transmit suitable map data to the movable apparatus 1-1 which cannot smoothly move in a space.

Alternatively, the predetermined period described above may have a length equal to or longer than a time during which a movable apparatus autonomously moves in a space and ends performance of a predetermined operation. If the predetermined period has such a length, the map data generation system 100 can generate more suitable map data on the basis of results of the movable apparatus 1-1 which has completed a predetermined operation in a space and can transmit it to the movable apparatus 1-1.

The operation data transmission unit 14-1 transmits the operation data to the map data generation device 21 and the user terminal 3.

The object recognition unit 16-1 performs object recognition processing of recognizing an object different from the movable apparatus 1-1 moving in a space and generates object recognition data indicating results of the object recognition processing. The said object different from the movable apparatus 1-1 is a person or the movable apparatus 1-2 or so on to the movable apparatus 1-*k*, for example.

In addition, the object recognition unit 16-1 uses an arbitrary technology in order to recognize an object different from the movable apparatus 1-1. For example, the object recognition unit 16-1 may use a machine learning model in order to recognize a person or may use an optical flow in order to recognize the movable apparatus 1-2 or so on to the movable apparatus 1-*k*. The object recognition data transmission unit 17-1 transmits the object recognition data to the map data generation device 21 and the user terminal 3.

The user terminal 3 receives the operation data and the object recognition data from the movable apparatus management device 10-1. Next, the user terminal 3 generates evaluation data indicating evaluation of a user with respect to results of the movable apparatus 1-1 autonomously moving in a space and performing a predetermined operation.

For example, the evaluation data is generated on the basis of information input to the user terminal 3 by a user who has referred to contents indicated by the operation data. Further, the user terminal 3 transmits the evaluation data to the map data generation device 21.

The operation data reception unit 213 receives the operation data from the map data generation device 21. In addition, the operation data reception unit 213 may receive operation data indicating the number of times of stops during a predetermined period when the movable apparatus 1-1 autonomously moves in a space and performs a predetermined operation.

Alternatively, the operation data reception unit 213 may receive operation data indicating positions of stops during a predetermined period when the movable apparatus 1-1 autonomously moves in a space and performs a predetermined operation. Alternatively, the operation data reception unit 213 may receive operation data indicating times for stops during a predetermined period when the movable apparatus 1-1 autonomously moves in a space and performs a predetermined operation.

Alternatively, the operation data reception unit 213 may receive operation data indicating the number of times of deviations from a predetermined path and detours during a predetermined period. Alternatively, the operation data reception unit 213 may receive operation data indicating positions of deviations from a predetermined path and detours during a predetermined period. Alternatively, the operation data reception unit 213 may receive operation data indicating times for deviations from a predetermined path and detours during a predetermined period.

The object recognition data reception unit 215 receives the object recognition data from the map data generation device 21. The evaluation data reception unit 216 receives the evaluation data from the map data generation device 21.

The map data generation unit 214 generates map data which is used when the movable apparatus 1-1 autonomously moves in a space and performs a predetermined operation on the basis of the operation data. For example, the map data generation unit 214 generates the map data by processing in which positions of points included in point cloud data, feature points included in a set, and the like are moved on one smooth surface; processing in which some of the feature points and the like are deleted; or the like.

In addition, in addition to the operation data, the map data generation unit 214 may generate the map data on the basis of at least one of the object recognition data and the evaluation data. For example, if the object recognition data indicates that a new object has been recognized in a space, the map data generation unit 214 reflects the object in the map indicated by the map data.

In addition, for example, if the evaluation data indicates that a predetermined operation in a particular region in a space is insufficient, the map data generation unit 214 generates map data indicating a map expressing the region in more detail.

In addition, for example, if the evaluation data indicates that a predetermined operation in a particular region in a space is sufficient, the map data generation unit 214 may generate map data indicating a map in which accuracy of the map of the region is lowered.

The map data indicates a map allowing the movable apparatus 1-1 to ascertain the position, the dimensions, the shape, and the like of each of objects present in a space without any problem when the movable apparatus 1-1 autonomously moves in the space and performs a predetermined operation.

Figure 6:
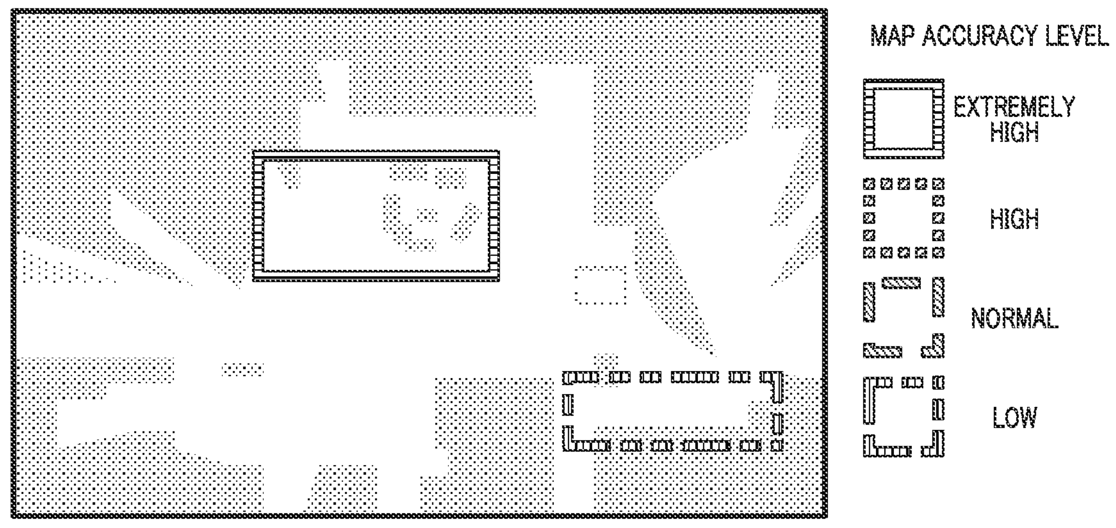
FIG. 6 is a view showing an example of a map indicated by map data according to the embodiment.

FIG. 6 is a view showing an example of a map indicated by the map data according to the embodiment. The white region shown in FIG. 6 indicates a space inside a building. The dot-hatching region shown in FIG. 6 indicates the outside of the building. The region surrounded by the horizontal hatching lines shown in FIG. 6 is at an "extremely-high" map accuracy level which is the highest in four stages.

The region surrounded by the diagonal hatching lines from the right upper side to the left lower side shown in FIG. 6 is at a "high" map accuracy level which is the second highest in the four stages. The region surrounded by the diagonal hatching lines from the left upper side to the right lower side shown in FIG. 6 is at a "normal" map accuracy level which is the third highest in the four stages. The region surrounded by the vertical hatching lines shown in FIG. 6 is at a "low" map accuracy level which is the lowest in the four stages.

For example, the said map accuracy is accuracy of boundaries inside a space of a building expressed by a map and is quantified based on the fineness of an occupancy grid. An occupancy grid is used for the movable apparatus 1-1 autonomously moving in a space of a building and performing a predetermined operation when a map indicated by the map data and results of a space ascertained by a sensor mounted in the movable apparatus 1-1 are verified.

In addition, the fineness of an occupancy grid may be independently set for each direction defined inside a two-dimensional or three-dimensional space. Moreover, a plurality of occupancy grids may be set while varying the fineness in the same region or may be managed by applying a different color for each fineness.

In consideration of contents related to the map accuracy described above, the map data generation unit 214 may generate a map in which at least a part of the accuracy is adjusted as necessary or may generate map data indicating the map. In addition, if it is judged that results indicated by the operation data have not reached a predetermined level, the map data generation unit 214 may generate a map having the higher accuracy or may generate map data indicating the map.

In addition, the map data generation unit 214 may further generate, on the basis of the map data, path data indicating a path for autonomous movement in a space when the movable apparatus 1-1 autonomously moves in the space and performs a predetermined operation. For example, the map data generation unit 214 generates the path data on the basis of at least one of the number of the points described above or feature points, the density, the distribution in a space, and the like.

In addition, the map data generation unit 214 may further generate, on the basis of the map data, region data indicating a region in which a predetermined operation ought to be performed in a space when the movable apparatus 1-1 autonomously moves in the space and performs a predetermined operation. For example, the map data generation unit 214 generates the region data on the basis of at least one of the number of the points described above or feature points, the density, the distribution in a space, and the like.

The map data transmission unit 212 transmits the map data to the movable apparatus management device 10-1. In addition, if the path data has been generated, the map data transmission unit 212 transmits the path data to the movable apparatus management device 10-1. In addition, if the region data has been generated, the map data transmission unit 212 transmits the region data to the movable apparatus management device 10-1.

The map data reception unit 15-1 receives the map data which is used when the movable apparatus 1-1 is caused to autonomously move in a space and perform a predetermined operation and is generated on the basis of the operation data. In addition, if the path data is transmitted, the map data reception unit 15-1 receives the path data from the map data generation device 21. In addition, if the region data is transmitted, the map data reception unit 15-1 receives the region data from the map data generation device 21.

Next, an example of processing performed by the map data generation system 100 will be described with reference to FIG. 7. FIG. 7 is a sequence diagram showing an example of processing performed by the map data generation system according to the embodiment.

In addition, the processing shown in FIG. 7 is performed if results of the object recognition processing of recognizing an object different from the movable apparatus 1-1 moving in a space are reflected in the map data. Alternatively, the processing shown in FIG. 7 is performed if evaluation of a user with respect to results of the movable apparatus 1-1 autonomously moving in a space and performing a predetermined operation are reflected in the map data.

In Step S701, the movable apparatus data transmission unit 11-1 transmits the movable apparatus data.

In Step S702, the movable apparatus data reception unit 211 receives the movable apparatus data.

In Step S703, the map data transmission unit 212 transmits the initial map data.

In Step S704, the initial map data reception unit 12-1 receives the initial map data.

In Step S705, the movable apparatus management device 10-1 generates the operation data and the object recognition data. Specifically, the operation data generation unit 13-1 generates the operation data. In addition, the object recognition unit 16-1 generates the object recognition data.

In Step S706, the movable apparatus management device 10-1 transmits the operation data and the object recognition data. Specifically, the operation data transmission unit 14-1 transmits the operation data. In addition, the object recognition data transmission unit 17-1 transmits the object recognition data.

In Step S707, the user terminal 3 receives the operation data and the object recognition data.

In Step S708, the map data generation device 21 receives the operation data and the object recognition data.

In Step S709, the user terminal 3 generates and transmits the evaluation data.

In Step S710, the evaluation data reception unit 216 receives the evaluation data.

In Step S711, the map data generation unit 214 generates the map data.

In Step S712, the map data transmission unit 212 transmits the map data.

In Step S713, the map data reception unit 15-1 receives the map data.

The movable apparatus management device 10-1 may not generate the object recognition data in Step S705. In this case, the movable apparatus management device 10-1 does not transmit the object recognition data to the map data generation device 21 in Step S706. In addition, in this case, the map data generation device 21 does not receive the object recognition data in Step S708 and generates the map data not based on the object recognition data in Step S711.

In addition, the movable apparatus management device 10-1 may not transmit the operation data and the object recognition data to the user terminal 3 in Step S706. In this case, the user terminal 3 does not receive the operation data and the object recognition data from the movable apparatus management device 10-1 in Step S707 and does not perform processing of generating the evaluation data in Step S709 and transmitting it to the map data generation device 21.

In addition, in this case, the map data generation device 21 does not receive the evaluation data from the user terminal 3 in Step S710 and generate the map data not based on the evaluation data in Step S711.

Next, another example of processing performed by the map data generation system 100 will be described with reference to FIG. 8. FIG. 8 is a sequence diagram showing another example of processing performed by the map data generation system according to the embodiment.

In addition, the processing shown in FIG. 8 is performed if there is a probability that the movable apparatus 1-1 cannot smoothly move in a space and it is desirable to immediately generate more suitable map data and transmit it to the movable apparatus 1-1.

In this case, the predetermined period described above has a length shorter than a time during which the movable apparatus 1-1 autonomously moves in a space and ends performance of a predetermined operation. In addition, in this case, it is preferable that the predetermined period described above be short as much as possible within a range in which operation data having an appropriate amount of data can be secured.

Alternatively, the processing shown in FIG. 8 is performed, although there is a probability that the movable apparatus 1-1 cannot smoothly move in a space, if it is desirable to generate more suitable map data and transmit it to the movable apparatus 1-1 after the movable apparatus 1-1 has completed a predetermined operation once in the space. In this case, the predetermined period described above has a length equal to or longer than a time during which the movable apparatus 1-1 autonomously moves in a space and ends performance of a predetermined operation.

In Step S801, the movable apparatus data transmission unit 11-1 transmits the movable apparatus data.

In Step S802, the movable apparatus data reception unit 211 receives the movable apparatus data.

In Step S803, the map data transmission unit 212 transmits the initial map data.

In Step S804, the initial map data reception unit 12-1 receives the initial map data.

In Step S805, the operation data generation unit 13-1 generates the operation data.

In Step S806, the operation data transmission unit 14-1 judges whether or not at least one of the number of times of stops, positions, and times during a predetermined period; and the number of times, positions, and times for deviations from a predetermined path and detours during a predetermined period satisfies predetermined conditions.

If it is judged that at least one of the number of times of stops and the like during a predetermined period, and the number of times and the like of deviations from a predetermined path and detours during a predetermined period satisfies the predetermined conditions (Step S806: YES), the operation data transmission unit 14-1 causes the processing to proceed to Step S807.

On the other hand, if it is judged that any of the number of times of stops and the like during a predetermined period, and the number of times and the like of deviations from a predetermined path and detours during a predetermined period does not satisfy the predetermined conditions (Step S806: NO), the operation data transmission unit 14-1 causes the processing to proceed to Step S808.

In Step S807, the operation data transmission unit 14-1 transmits the operation data.

In Step S808, the movable apparatus management device 10-1 ends the processing.

In Step S809, the operation data reception unit 213 receives the operation data.

In Step S810, the map data generation unit 214 generates the map data.

In Step S811, the map data transmission unit 212 transmits the map data.

In Step S812, the map data reception unit 15-1 receives the map data.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the map data generation device and the like through a network or various storage media. Then, a computer (or a CPU, an MPU, or the like) of the map data generation device and the like may be configured to read and perform the program. In such a case, the program and the storage medium storing the program configure the present invention.

Alternatively, for example, the present invention includes those realized using at least one processor or circuit configured to function of the embodiments explained above. A plurality of processors may be used for distributed processing.

This application claims the benefit of Japanese Patent Application No. 2022-182489, filed on Nov. 15, 2022, which is hereby incorporated by reference herein in its entirety.

What is claimed is:

1. A map data generation device comprising: at least one processor or circuit configured to function as:

an operation data reception unit configured to receive operation data indicating results of a movable apparatus autonomously moving in a space and performing a predetermined operation;

a map data generation unit configured to generate map data which is used when the movable apparatus autonomously moves in the space and performs the predetermined operation on the basis of the operation data, wherein the operation data reception unit receives the operation data indicating, as event information indicating actual events of the movable apparatus during a predetermined period, at least one of the number of times of stops during the predetermined period when the movable apparatus autonomously moves in the space and performs the predetermined operation, positions of stops during the predetermined period, times for stops during the predetermined period, the number of times of deviations from a predetermined path and detours during the predetermined period, positions of deviations from the predetermined path and detours during the predetermined period, and times for deviations from the predetermined path and detours during the predetermined period, wherein the operation data reception unit receives, as the operation data, the event information obtained after filtering such that stops or detours whose cause is detection of a person, an animal, or another movable apparatus is excluded from said number, position and time; and using the generated map to control autonomous movement of a movable apparatus.

2. The map data generation device according to claim 1, wherein the predetermined period has a length shorter than a time during which the movable apparatus autonomously moves in the space and ends performance of the predetermined operation.

3. The map data generation device according to claim 1, wherein the predetermined period has a length equal to or longer than a time during which the movable apparatus autonomously moves in the space and ends performance of the predetermined operation.

4. The map data generation device according to claim 1, wherein the operation data reception unit receives the operation data indicating at least a part of results of the movable apparatus autonomously moving in the space and performing the predetermined operation.

5. The map data generation device according to claim 1, wherein the map data generation unit further generates, on the basis of the map data, at least one of path data indicating a path for autonomous movement in the space when the movable apparatus autonomously moves in the space and performs the predetermined operation, and region data indicating a region in which the predetermined operation is to be performed in the space when the movable apparatus autonomously moves in the space and performs the predetermined operation.

6. The map data generation device according to claim 1, wherein the at least one processor or circuit is further configured to function as:

an object recognition data reception unit configured to receive object recognition data indicating results of object recognition processing of recognizing an object different from the movable apparatus, and the map data generation unit generates the map data on the basis of the object recognition data.

7. The map data generation device according to claim 1, wherein the at least one processor or circuit is further configured to function as:

an evaluation data reception unit configured to receive evaluation data indicating evaluation of a user with respect to results of the movable apparatus autonomously moving in the space and performing the predetermined operation, and the map data generation unit generates the map data on the basis of the evaluation data.

8. A non-transitory computer-readable storage medium storing a computer program including instructions for performing following processes:

receiving operation data indicating results of a movable apparatus autonomously moving in a space and performing a predetermined operation;

generating map data which is used when the movable apparatus autonomously moves in the space and performs the predetermined operation on the basis of the operation data, wherein the receiving includes receiving the operation data indicating, as event information indicating actual events of the movable apparatus, at least one of the number of times of stops during a predetermined period when the movable apparatus autonomously moves in the space and performs the predetermined operation, positions of stops during the predetermined period, times for stops during the predetermined period, the number of times of deviations from a predetermined path and detours during the predetermined period, positions of deviations from the predetermined path and detours during the predetermined period, and times for deviations from the predetermined path and detours during the predetermined period, wherein the receiving includes receiving, as the operation data, the event information obtained after filtering such that stops or detours whose cause is detection of a person, an animal, or another movable apparatus is excluded from said number, position and time; and using the generated map to control autonomous movement of a movable apparatus.

9. A map data generation method comprising:

receiving operation data indicating results of a movable apparatus autonomously moving in a space and performing a predetermined operation;

generating map data which is used when the movable apparatus autonomously moves in the space and performs the predetermined operation on the basis of the operation data, wherein the receiving includes receiving the operation data indicating, as event information indicating actual events of the movable apparatus, at least one of the number of times of stops during a predetermined period when the movable apparatus autonomously moves in the space and performs the predetermined operation, positions of stops during the predetermined period, times for stops during the predetermined period, the number of times of deviations from a predetermined path and detours during the predetermined period, positions of deviations from the predetermined path and detours during the predetermined period, and times for deviations from the predetermined path and detours during the predetermined period, wherein the receiving includes receiving, as the operation data, the event information obtained after filtering such that stops or detours whose cause is detection of a person, an animal, or another movable apparatus is excluded from said number, position and time; and using the generated map to control autonomous movement of a movable apparatus.

* * * * *